May 23, 1967     R. A. GRIMM ET AL     3,321,754

BATTERY VOLTAGE INDICATING SYSTEM

Filed Aug. 20, 1964     2 Sheets-Sheet 1

INVENTORS
ROBERT A. GRIMM
HARRY G. JOHNSON

C. R. Meland
THEIR ATTORNEY

INVENTORS
ROBERT A. GRIMM
HARRY G. JOHNSON
C. R. Meland
THEIR ATTORNEY

United States Patent Office 3,321,754
Patented May 23, 1967

---

3,321,754
BATTERY VOLTAGE INDICATING SYSTEM
Robert A. Grimm and Harry G. Johnson, Flint, Mich., assignors to General Motors Corporation, Detroit, Mich., a corporation of Delaware
Filed Aug. 20, 1964, Ser. No. 390,840
4 Claims. (Cl. 340—249)

This invention relates to an indicating system and more particularly to an indicating system for indicating the system voltage in a motor vehicle electrical system.

One of the objects of this invention is to provide an indicating system for motor vehicle electrical systems which is capable of accurately sensing the system voltage and providing an indication as to whether or not the voltage is at a normal acceptable value.

Another object of this invention is to provide a voltage indicating system for a motor vehicle electrical system which uses a Zener diode as the element for sensing system voltage.

A further object of this invention is to provide a voltage indicating system for a motor vehicle electrical system which is capable of giving a visual indication of both high and low voltage conditions.

Still a further object of this invention is to provide a voltage indicating system that is capable of providing a visual indication of high, low and normal voltage conditions in a motor vehicle electrical system.

Further objects and advantages of the present invention will be apparent from the following description, reference being had to the accompanying drawings wherein preferred embodiments of the present invention are clearly shown.

Figure 1:
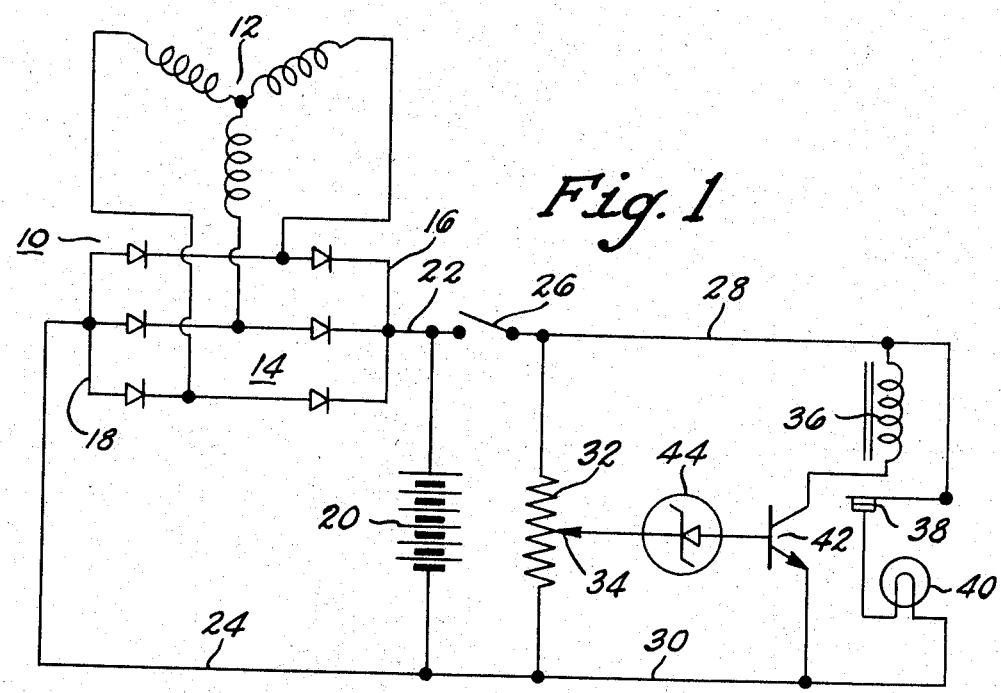
FIGURE 1 is a schematic circuit diagram of a voltage indicating system made in accordance with this invention.

Referring now to the drawings and more particularly to FIGURE 1, the reference numeral 10 generally designates a diode-rectified alternating current generator. This power unit includes a three phase Y-connected output winding 12 and a three phase full-wave bridge rectifier 14. The bridge rectifier 14 has a positive D.C. output terminal 16 and a negative D.C. output terminal 18. The alternating current generator has a field winding which is not illustrated and the field current for the field winding is controlled by a conventional voltage regulator which likewise is not illustrated, these elements being known to those skilled in the art. The bridge rectifier 14 supplies direct current loads on a motor vehicle including a battery 20. The battery 20 is connected across the conductors 22 and 24 which are load conductors in a motor vehicle electrical system. The conductors 22 or 24 may be grounded if so desired.

The conductor 22 is connected to one side of an ignition switch 26, the opposite side of the ignition switch being connected with conductor 28. The conductor 24 is connected with a conductor 30. A potentiometer resistor 32 is connected across the conductors 28 and 30 and has an adjustable tap 34.

The indicating system of FIGURE 1 includes a relay having an actuating coil 36 and normally closed contacts 38. It is seen that the contacts 38 and a signal lamp 40 are connected across conductors 28 and 30. The actuating coil 36 of the relay is connected in series with the collector-emitter circuit of an NPN transistor 42. A Zener diode 44 is connected between the base of transistor 42 and the shiftable tap 34 on the potentiometer resistor 32.

The electrical system of FIGURE 1 will sense the voltage appearing across conductors 28 and 30 and when this voltage is below a predetermined value as determined by the adjustment of tap 34, the signal lamp 40 will be energized. To further explain this, it will be appreciated that the signal lamp 40 will be energized as long as contacts 38 are closed. Contacts 38 remain closed until the transistor 42 is biased to conduct. The transistor 42 will be nonconductive as long as the voltage appearing between conductors 28 and 30 is below a value sufficient to break down the Zener diode 44.

When the voltage appearing across conductors 28 and 30 rises to a value that is sufficient to break down the Zener diode 44, the transistor 42 will conduct in its emitter-collector circuit energizing the actuating coil 36 which causes the contacts 38 to open. This breaks the circuit to the lamp 40 which indicates that system voltage is above a predetermined value.

The potentiometer resistor 32 is adjusted so that the signal lamp 40 will be extinguished when system voltage is at a normal value for charging the battery 20.

Figure 2:
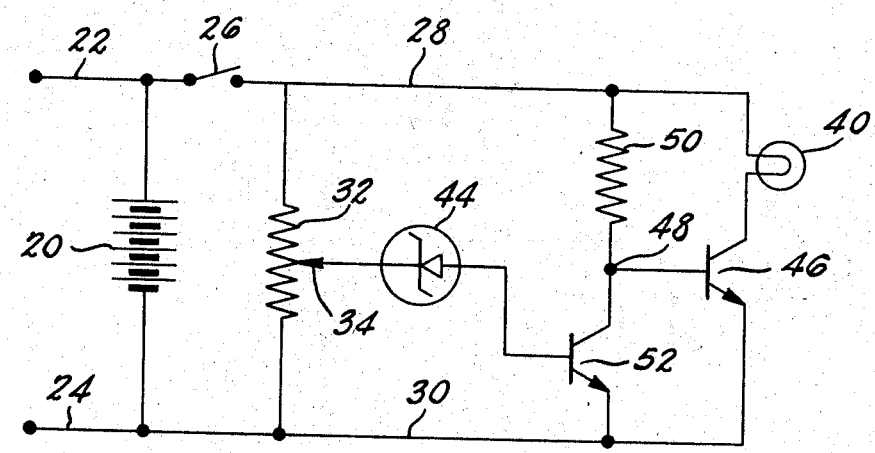
FIGURE 2 is a schematic diagram of a system which is similar to FIGURE 1 but which uses a transistor in place of a relay for controlling the energization of a signal lamp.

Referring now to FIGURE 2, an indicating system is illustrated which is similar to FIGURE 1. In FIGURE 2, the same reference numerals have been used as were used in FIGURE 1 to identify the same parts. In FIGURE 2, the diode-rectified alternator is not illustrated, it being understood that it is connected with conductors 22 and 24 in the same manner as shown in FIGURE 1.

In FIGURE 2, the energization of the signal lamp 40 is controlled by a transistor 46 rather than by a relay. The signal lamp 40 and the collector-emitter circuit of transistor 46 are connected across conductors 28 and 30. The base of transistor 46 is connected with junction 48. A resistor 50 connects the conductor 28 and the junction 48. A transistor 52 which can be of the same type as transistor 42 shown in FIGURE 1 has its collector connected with junction 48 and its emitter connected to conductor 30. The Zener diode 44 is connected between tap 34 and the base of the transistor 52.

The system of FIGURE 2 like the system of FIGURE 1 senses the voltage appearing across battery 20. When this voltage is below a predetermined acceptable level, the Zener diode will not break down and the transistor 46 will be biased to conduct since the voltage of junction 48 will be higher than the voltage of the emitter of transistor 46. When the transistor 46 turns on, the signal lamp 40 will be energized.

When the voltage appearing across conductors 28 and 30 rises above or to an acceptable level, the Zener diode 44 will break down causing the transistor 52 to conduct in its collector-emitter circuit. When transistor 52 conducts, the voltage of junction 48 approaches the voltage of conductor 30 and the base of transistor 46 therefore is at substantially the same potential as the emitter of transistor 46. This turns off the transistor 46 which effectively breaks the circuit for the signal lamp 40 indicating that the voltage is now at an acceptable level.

Figure 3:
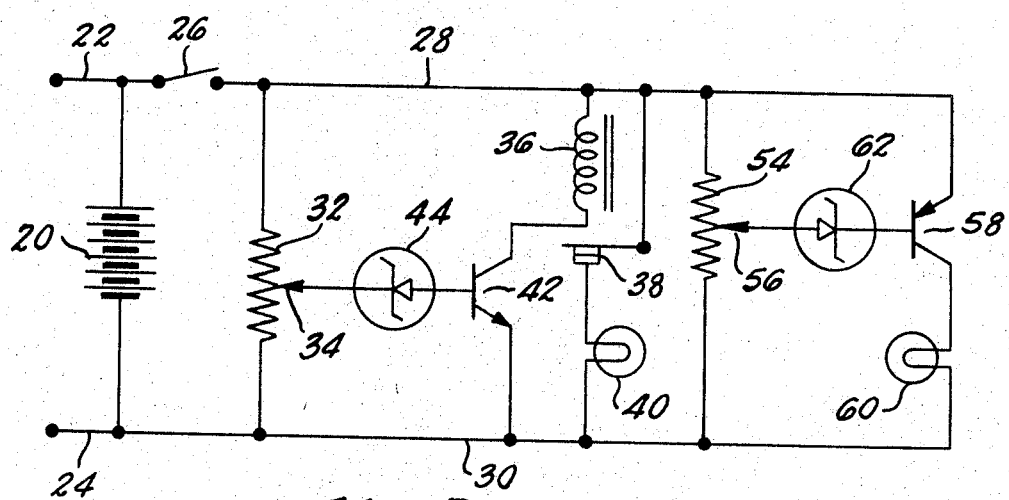
FIGURE 3 is a schematic circuit diagram of an indicating system which is capable of providing a visual indication of both high and low voltage conditions.

Referring now to FIGURE 3, an indicating system is illustrated which is capable of providing a visual indication of both high and low voltage conditions in an electrical system. In FIGURE 3, the same reference numerals have been used as were used in FIGURE 1 to identify the same parts in each figure. The diode rectified alternator is not illustrated in FIGURE 3 but would be connected with conductors 22 and 24 in the same manner as shown in FIGURE 1.

It will be appreciated by comparing FIGURES 1 and 3 that the system for indicating low voltage is the same in each figure. Thus in FIGURE 3, the energization of signal lamp 40 is controlled by relay contacts 38 and the actuating coil 36 of the relay is connected in series with the transistor 42. The conduction of transistor 42 is controlled by Zener diode 44 and potentiometer resistor 32 in the same manner as the system shown in FIGURE 1.

In the system of FIGURE 3, an additional circuit has been added to indicate an abnormally high voltage condition. This circuit includes a potentiometer resistor 54 having an adjustable tap or slider 56. The potentiometer resistor 54 is connected across conductors 28 and 30 so that the voltage developed across it will be a function of the voltage appearing across battery 20.

A PNP transistor 58 is provided which is connected in series with a signal lamp 60. A Zener diode 62 is connected between the base of transistor 58 and the adjustable tap 56 of the resistor 54.

In the system of FIGURE 3, the adjustment of potentiometer resistor 54 and the breakdown voltage of Zener diode 62 is selected such that transistor 58 will not be biased to conduct unless the voltage appearing across conductors 28 and 30 is abnormally high. In a 12 volt system, the abnormally high voltage may be, for example, 16 volts or higher. When this abnormally high voltage appears between conductors 28 and 30, the Zener diode 62 breaks down biasing the transistor 58 to a conductive condition and therefore causing the lamp 60 to light.

The signal lamp 40 will indicate the low voltage condition in the system of FIGURE 3 while the signal lamp 60 indicates the abnormally high voltage condition. The abnormally high voltage condition can occur when there is a failure in the voltage regulator such as a short circuit where full field current is continuously supplied to the field of the diode-rectified alternator.

Figure 4:
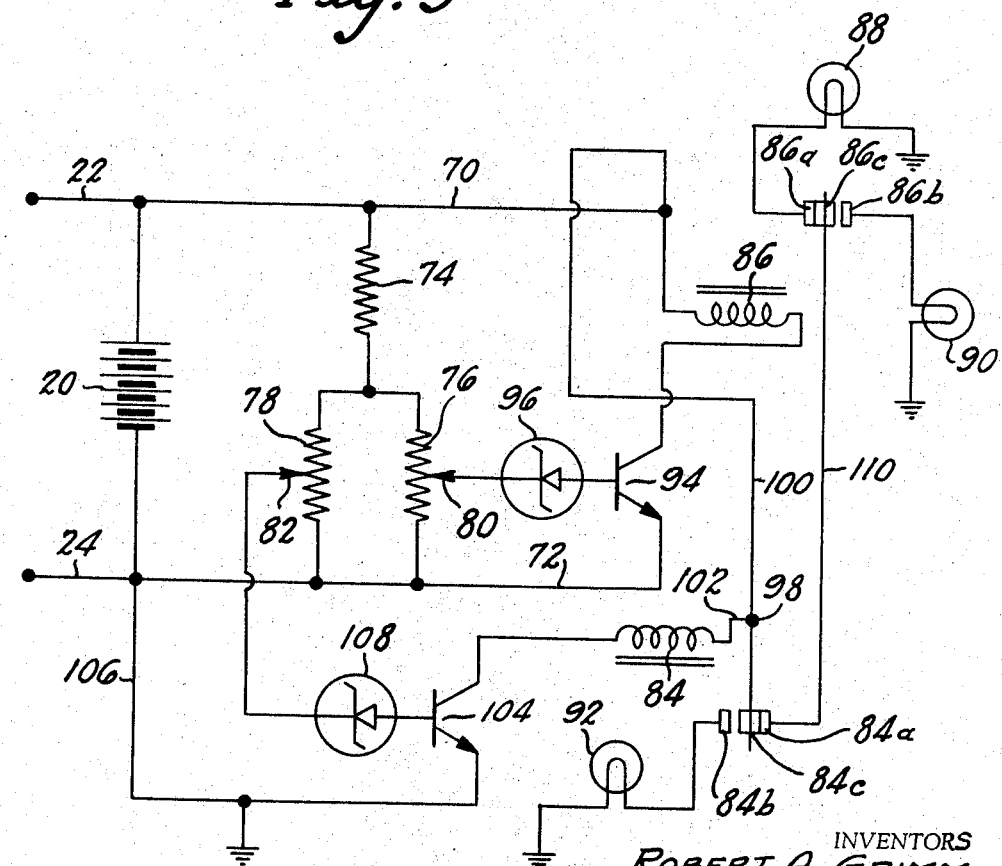
FIGURE 4 is a schematic circuit diagram of a voltage indicating system which is capable of providing a visual indication of high, low and normal voltage conditions in a motor vehicle electrical system.

Referring now to FIGURE 4, a voltage indicating system is illustrated which is capable of providing a visual indication of high, low and normal system voltage conditions. The diode-rectified alternator for charging battery 20 is not illustrated in FIGURE 4 but it would be connected with conductors 22 and 24 in the same manner as shown in FIGURE 1.

In FIGURE 4, a voltage divider is connected across conductors 70 and 72 and includes resistor 74 and potentiometer resistors 76 and 78. The potentiometer resistor 76 has a shiftable slider or tap 80 while the potentiometer resistor 78 has a shiftable slider or tap 82.

The system of FIGURE 4 has two relays which control the energization of signal lamps. One of these relays has an actuating coil 84, fixed contacts 84a and 84b and a movable contact 84c. The other relay includes an actuating coil 86, fixed contacts 86a and 86b and a movable contact 86c. The contact 84c engages contact 84a when relay coil 84 is not energized but the contact 84c engages contact 84b when relay coil 84 is energized. In a similar fashion, contacts 86a and 86c are engaged when relay coil 86 is not energized but contact 86c engages contact 86b when the relay coil 86 is energized.

A signal lamp 88 is connected between contact 86a and ground which is the low voltage indicator. Another signal lamp 90 is connected between contact 86b and ground. This signal lamp is the normal voltage indicator. A signal lamp 92 is connected between contact 84b and ground and this signal lamp is the high voltage indicator.

The relay coil is connected in series with an NPN transistor 94. A Zener diode 96 is connected between the base of transistor 94 and the slider 80 of potentiometer resistor 76.

The conductor 70 is connected with junction 98 by a conductor 100. The junction 98 is connected with movable contact 84c. This junction is also connected to one slide of relay coil 84 by a conductor 102. The relay coil 84 is connected in series with the collector-emitter circuit of an NPN transistor 104. The emitter of transistor 104 is connected with conductor 72 by a conductor 106. A Zener diode 108 is connected between the base of transistor 104 and the shiftable tap 82 of the potentiometer resistor 78. The fixed contact 84a is connected with the movable contact 86c by a conductor 110.

The operation of the indicating system illustrated in FIGURE 4 will now be described. Assuming that the voltage appearing across conductors 70 and 72 is below a desired value, the signal lamp 88 will light. This circuit can be traced from the positive side of battery 20, through conductor 70, through conductor 100, through contacts 84c and 84a, through conductor 110, through contacts 86c and 86a and through lamp 88 to ground.

When the system voltage appearing between conductors 70 and 72 is at a normal value, the signal lamp 88 will be extinguished and the lamp 90 will be lit. Thus during a normal voltage condition, the tap 80 is adjusted such that Zener diode 96 will break down to cause transistor 94 to conduct. When transistor 94 conducts, the relay coil 86 is energized causing the contact 86c to move away from 86a and into engagement with contact 86b. The lamp 88 is now extinguished and the lamp 90 will be lit.

If the terminal voltage of the system rises above some predetermined desired value, the lamp 92 will light and lamps 88 and 90 will be extinguished. During this abnormally high voltage condition, the Zener diode 108 breaks down causing transistor 104 to conduct. This energizes the relay coil 84 which causes contact 84c to move away from contact 84a and into engagement with contact 84b. This switching action breaks the circuit to conductor 110 but completes the circuit to signal lamp 92 indicating an abnormally high voltage condition which may occur, for example, by a failure in the voltage regulator or other part of the system.

While the embodiments of the present invention as herein disclosed constitute a preferred form, it is to be understood that other forms might be adopted.

What is claimed is as follows:

1. An indicating system for a battery charging system comprising, a source of direct current, conductors connected with opposite ends of said source of direct current, a battery connected across said conductors, first, second and third signal lamps, a first control means connected to sense the voltage across said conductors and operative to control the energization of said first and second signal lamps, said first control means completing a circuit for said first signal lamp when the voltage appearing across said conductors is below a first predetermined value, said first control means completing a circuit for said second signal lamp and deenergizing said first signal lamp when the voltage appearing across said conductors is above said first predetermined value, second control means including means for sensing the voltage appearing across said conductors and including means for controlling the energization of said second and third signal lamps, said second control means completing a circuit for said third signal lamp and deenergizing said second signal lamp when the voltage appearing across said conductors rise to a value which is above a second predetermined value, said second predetermined value being higher than said first predetermined value.

2. A voltage indicating system for a motor vehicle electrical system comprising, a source of direct current, first and second conductors connected with opposite ends of said source of direct current, a battery connected across said conductors, first and second relays each having an actuating coil, a pair of fixed contacts and a movable contact, means connecting the movable contact of said first relay with one of the fixed contacts of said second relay, means connecting the movable contact of said second relay with said first conductor, a first signal lamp connected between one of the fixed contacts of said first relay and said second conductor, a second signal lamp connected between the other fixed contacts of said first relay and said second conductor, a third signal lamp connected between the second fixed contact of said second relay and said second conductor, control means connected with the actuating coil of said first relay for controlling the energization of said first relay in accordance with the voltage sensed across said first and second conductors, control means connected with the actuating coil of said second relay for controlling the operation of said second relay in accordance with the voltage appearing across said first and second conductors, said first signal lamp being energized when the voltage across said conductors is below a first predetermined value, said second signal lamp being energized and said first signal lamp deenergized when the voltage across said conductors is above said first predetermined value, said third signal lamp being energized when the voltage across said conductors is above a second predetermined value, said second predetermined value being higher than said first predetermined value.

3. A voltage indicating system for a motor vehicle electrical system comprising, a source of direct current, conductors connected with said source of direct current, a battery connected across said conductors, a first control circuit for sensing the voltage appearing across said conductors including a first Zener diode and a first transistor, a second control circuit including a second Zener diode and a second transistor operative to sense the voltage appearing across said conductors, first, second and third signal lamps, means for controlling the energization of said first and second signal lamps in accordance with the conduction of said first transistor, said first signal lamp being energized when the voltage across said conductors is below a first predetermined value, said second signal lamp being energized and said first signal lamp deenergized when the voltage across said conductors is above said first predetermined value, and means for controlling the energization of said third signal lamp in accordance with the conduction of said second transistor, said third signal lamp being energized and said second signal lamp to be deenergized when the voltage across said conductors is above a second predetermined value, said second predetermined value being higher than said first predetermined value.

4. A voltage indicating system for a motor vehicle electrical system comprising, a source of direct current, conductors connected with said source of direct current, a battery connected across said conductors, a first control circuit for sensing the voltage appearing across said conductors, first and second signal lamps, means connecting said first control circuit with said signal lamps whereby said first signal lamp is energized when the voltage appearing across said conductors is below a first predetermined value, said first control circuit being operative to energize said second signal lamp and deenergize said first signal lamp when the voltage appearing across said conductors is above said first predetermined value, and a second control circuit connected with said conductors for sensing the voltage appearing across said conductors, a third signal lamp connected to said second control circuit, said second control circuit being operative to connect said third signal lamp with said conductors when the voltage appearing across said conductors reaches a second predetermined value which is higher than said first predetermined value, said second control circuit being connected in series with said first and second signal lamps and being operative to disconnect said first and second signal lamps from said conductors when the voltage appearing across said conductors reaches said second predetermined value.

References Cited by the Examiner

UNITED STATES PATENTS

| | | |
|---|---|---|
| 2,959,717 | 11/1960 | Conger. |
| 3,018,432 | 1/1962 | Palmer _____ 340—249 X |
| 3,141,156 | 7/1964 | Freedman et al. _____ 340—255 |
| 3,193,755 | 7/1965 | Zelina. |
| 3,209,212 | 9/1965 | Billings _____ 317—148.5 X |
| 3,219,876 | 11/1965 | Bays et al. |
| 3,230,443 | 1/1966 | Hallidy. |

OTHER REFERENCES

Electronic Design, Mar. 15, 1962, pp. 103–104.

NEIL C. READ, *Primary Examiner.*

D. MYER, *Assistant Examiner.*